Dec. 13, 1966   A. J. WILSON   3,291,537
ANTI-SKID DEVICE FOR VEHICLES
Filed Sept. 20, 1963   4 Sheets-Sheet 2
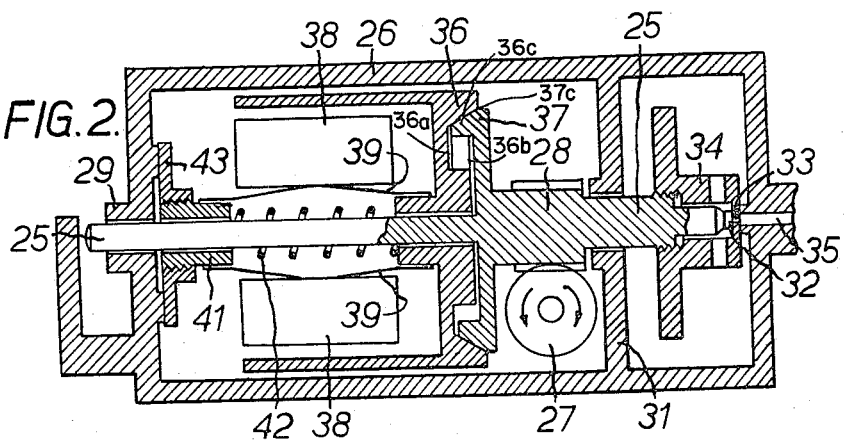
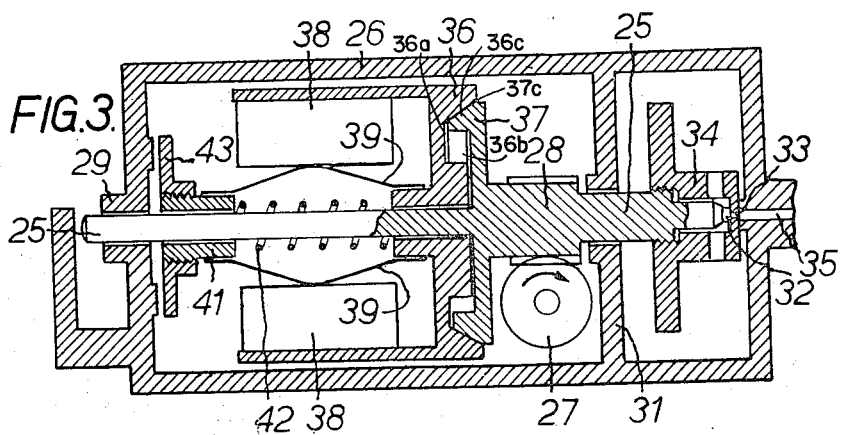
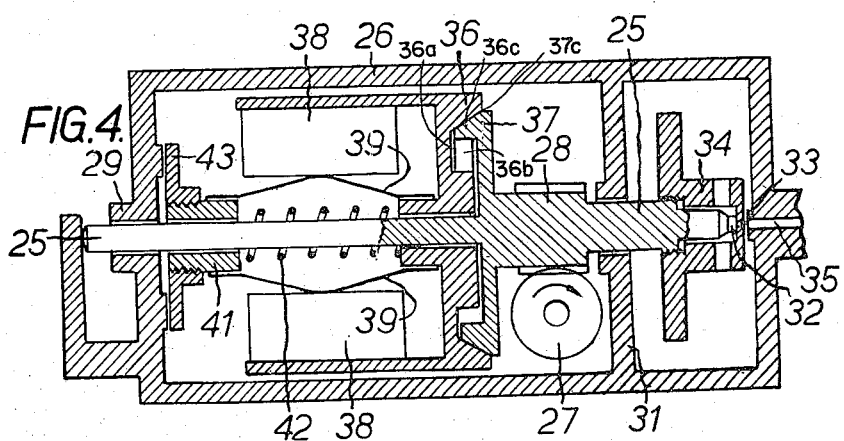
Alexander John Wilson
BY Scrivener + Parker

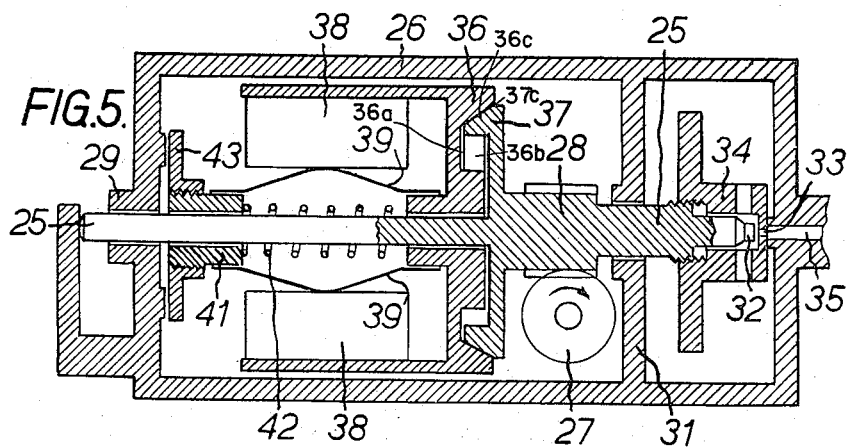
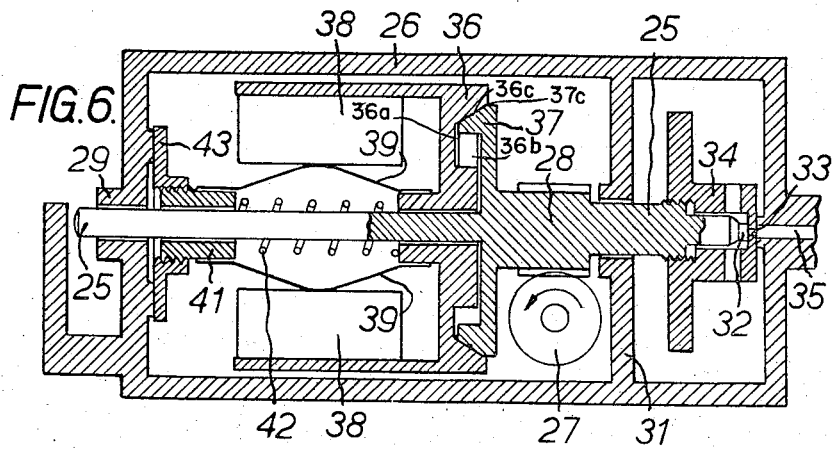
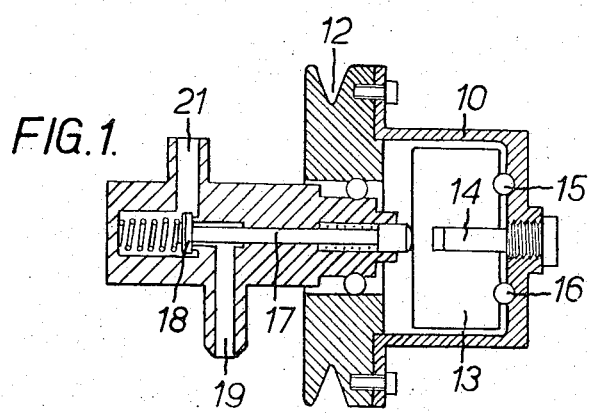
Alexander John Wilson
BY Scrivener + Parker

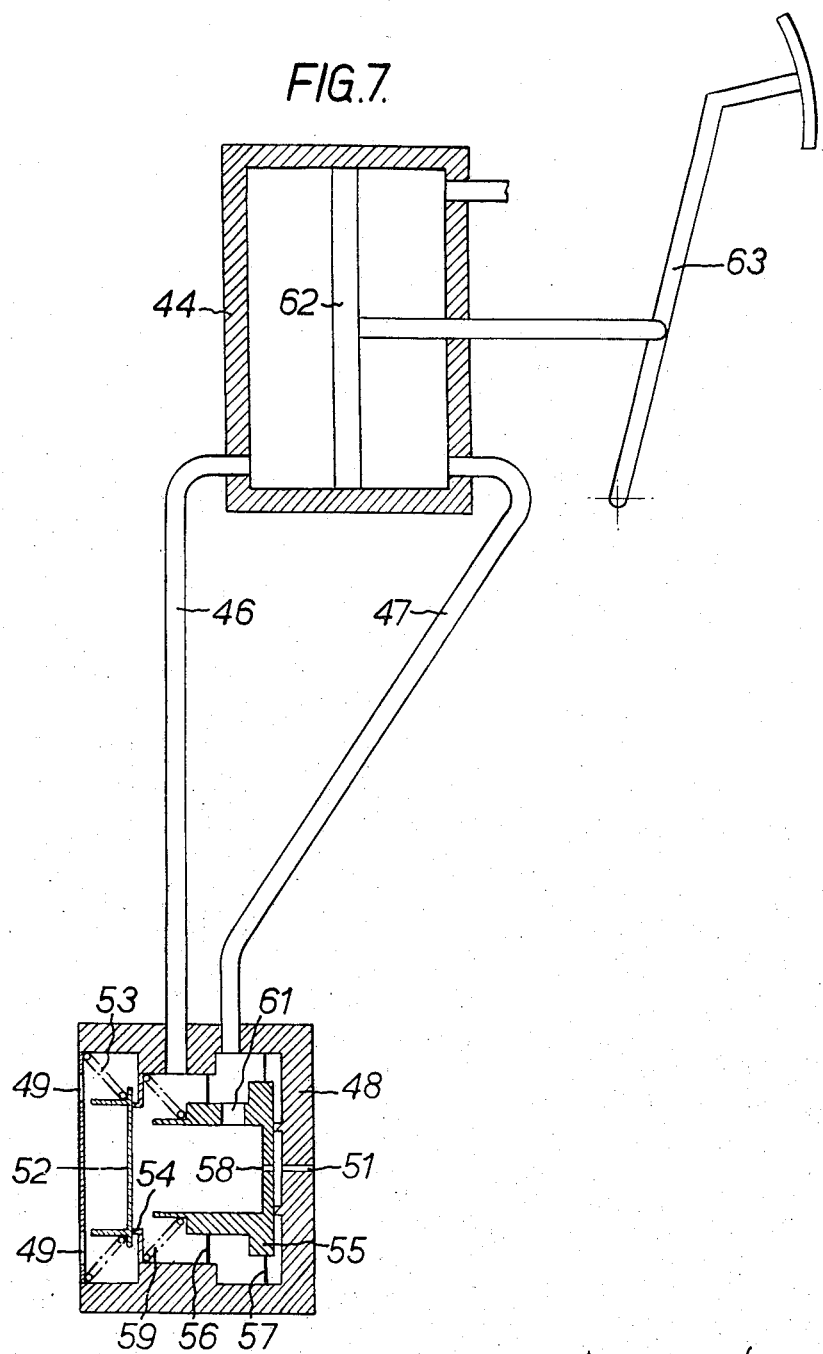

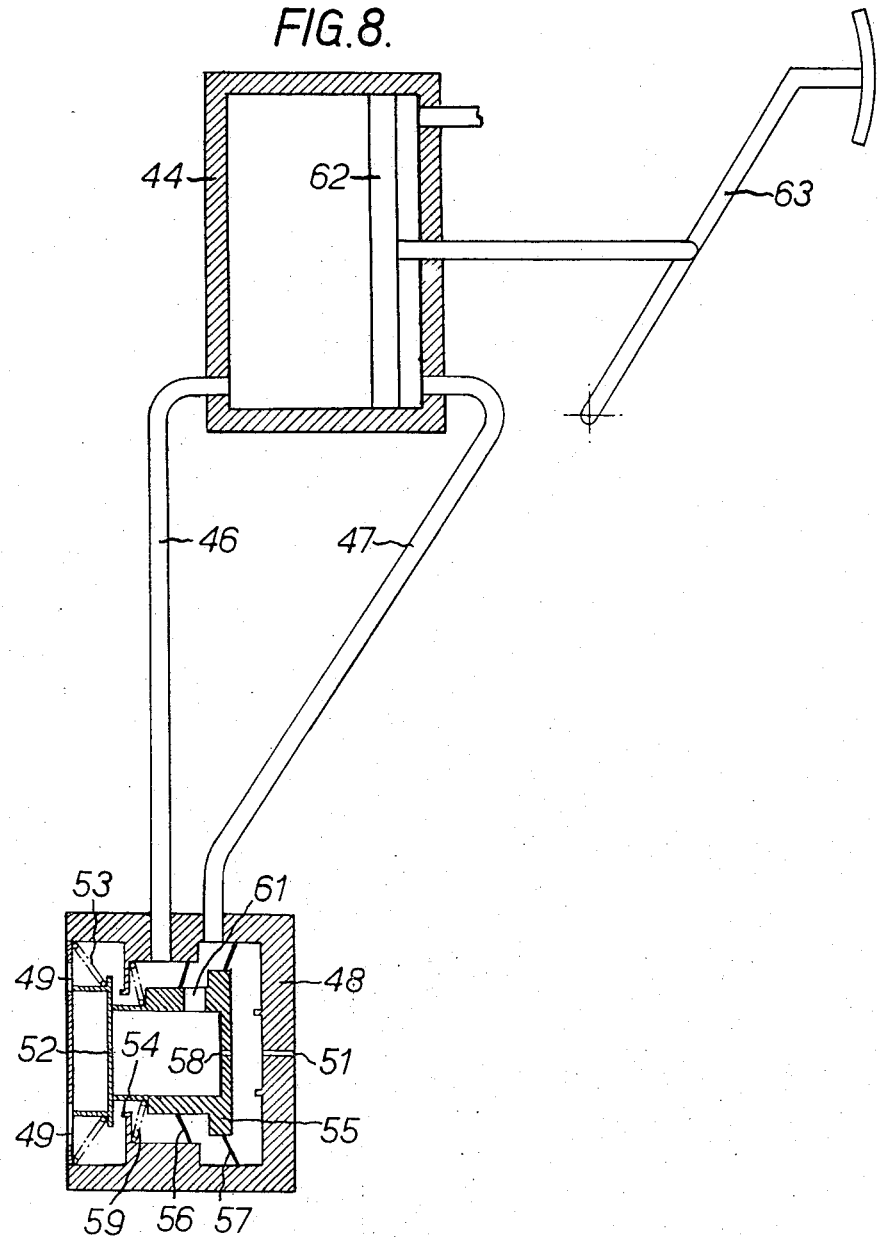

3,291,537
ANTI-SKID DEVICE FOR VEHICLES
Alexander John Wilson, Sutton Coldfield, England, assignor to Girling Limited, Tyseley, England, a British company
Filed Sept. 20, 1963, Ser. No. 310,213
10 Claims. (Cl. 303—21)

This invention relates to a new or improved anti-skid device for road vehicles.

When a vehicle is being braked it is liable to skid if a wheel becomes locked or if its rate of rotation is suddenly reduced to a low value, the point at which a wheel becomes locked depending on the coefficient of friction between the tyre and the road surface which may be relatively low on wet, smooth road surfaces, and very low on iced surfaces. Locking of the rear wheels of a vehicle is more liable to occur than locking of the front wheels, owing to the transfer of weight from the rear to the front by inertia forces when the vehicle is being rapidly decelerated.

In order to prevent or reduce the risk of skidding, various proposals have been made for limiting the maximum effort which can be applied to the rear wheels of a vehicle. Various devices have also been proposed for automatically reducing the braking effort applied to a wheel when the wheel locks or is approaching a locked condition, but these devices are dependent solely on rotational deceleration of the wheel, and take no account of the rate of deceleration of the vehicle which may be very different from the rate of deceleration of the wheel under different road surface conditions.

An anti-skid device for vehicles according to our invention provides control of the braking effort applied to a wheel by a member which is responsive both to the rate of deceleration of the wheel and to the rate of deceleration of the vehicle itself.

The control member is conveniently a rotatable member which is driven from a wheel or a transmission member such as a cardan-shaft and is also movable in the direction of its axis which lies in the direction of movement of the vehicle.

Means may be incorporated in the device for preventing operation of the anti-skid control below a pre-determined vehicle speed, and for rendering it inoperative when the vehicle is travelling in reverse.

The rotatable and axially movable control member may take various forms, of which two are illustrated by way of example in the accompanying drawings, in which:

FIGURE 1 is a diagrammatic longitudinal section of one form of skid control device;

FIGURE 2 is a diagrammatic longitudinal section of another form of skid control device;

FIGURES 3, 4 and 5 and 6 are sections similar to FIGURE 2, but showing the parts of the mechanism in the positions they assume under different conditions; and FIGURES 7 and 8 are diagrammatic views of a relay valve and slave cylinder suitable for use with either of the devices shown in FIGURE 1 and in FIGURES 2 to 6 respectively.

In the device shown in FIGURE 1, a housing 10 rotatably mounted on a stationary member 11 is driven from a vehicle wheel or from a part of the transmission to the wheel in any convenient manner as for example by means of a belt engaging in a V groove 12 in the housing. A flywheel 13 is rotatably mounted on a stationary spindle 14 fixed in the end wall 15 of the housing, and is also axially movable on the spindle. Cam means such as balls 16 located in co-operating inclined recesses in the two surfaces are arranged between the flywheel and the end wall 15. The flywheel is urged towards the end wall 15 by a spring-loaded plunger 17 slidably mounted in a bore in the body in axial alignment with the spindle 14, and the plunger carries a valve head 18 normally engaging a valve seating between an air inlet 19 and an outlet 21 leading to a servo or relay.

The device is mounted on a vehicle with the axis of the spindle 14 parallel to the longitudinal axis of the vehicle, and the flywheel at the forward end.

When the vehicle is travelling normally, the parts are in the positions shown, the flywheel being constrained by the balls 16 to rotate with and at the same speed as the housing. When the wheel by which the housing is being driven is rapidly decelerated, the housing is decelerated with it, but owing to its inertia, the flywheel tends to continue to rotate at its previous speed and the co-operation of the balls with the inclined recesses in the flywheel and in the end wall of the housing moves the flywheel axially to the left and the flywheel takes the plunger 17 with it and opens the valve 18 to allow air to pass from the inlet 19 to the outlet 21 leading to the servo or relay which reduces the braking effort applied to the wheel. The movement of the flywheel to the left caused by the deceleration of the wheel is opposed by the inertia forces of the flywheel, due to deceleration of the vehicle, which tend to cause the flywheel to move to the right and therefore to continue to rotate with the housing. The device is therefore sensitive to the rate of deceleration of the vehicle as well as the rate of deceleration of the wheel, and the resultant movement of the flywheel is a combination of the effects of these two rates of deceleration. By selection of the dimensions of the parts of the device, very close coordination can be maintained between vehicle deceleration and wheel deceleration, and movement of the plunger 17 will only take place when the rate of deceleration of the wheel does not correspond to the rate of deceleration of the vehicle.

In the device shown in FIGURES 2 to 6, the rotatable and axially movable member is a spindle 25 which is rotatably mounted in a housing 26 and is driven by a worm or skew-gear 27 meshing with a worm-wheel or skew-gear 28 on the spindle, the drive permitting axial movement of the spindle relative to the worm. One end of the spindle is slidably and rotatably mounted in a bearing 29 at the left hand end of the housing, and at an intermediate point in its length the spindle is slidably and rotatably mounted in a bearing in a partition 31 in the housing. At its right hand end the spindle is reduced in diameter and terminates in a spigot 32 adapted to engage and close a small orifice 33 in a member 34 which is in screw-threaded engagement with the spindle and of which the function is described below, and the member 34 in turn is adapted to engage and close a passage 35 in the end of the housing. The chamber in the housing on the right of the partition 31 is open to atmosphere through a port located at any convenient point and the passage 35 is adapted to be connected to a servo or relay which on the admission or air reduces the braking effort applied to the wheel by which the spindle 25 is driven.

A flywheel 36 rotatably mounted on the spindle is coupled to the spindle by clutch means made up of a one-way clutch formed by a three-lobe formation 36a on the flywheel 36 and three rollers 36b within a cup-shaped member 37 secured to the spindle, and a friction clutch formed by inter-engageable conical faces 36c, 37c on the flywheel and on the member 37 respectively.

Centrifugally operating shoes 38 adapted to engage the inner surface of the flywheel are mounted on longitudinal blade springs 39 which are secured at one end of the flywheel and at the other end to a flanged sleeve 41 which is axially slidable on the spindle. A light compression spring 42 is mounted on the spindle between the flywheel and the sleeve 41.

The device is mounted on a vehicle with the axis of the spindle 25 parallel to the longitudinal axis of the vehicle, and the right hand end of the housing directed forwardly.

When the vehicle is travelling normally, the spindle 25 is driven from a road wheel or a part of the transmission, and at low vehicle speeds the parts are in the positions shown in IGURE 2. The flywheel 36 is driven by the spindle through the one-way clutch 36a, 36b. The shoes 38 are in their innermost positions and the springs 39 and 42 urge the sleeve 41 against the left hand end of the housing and urge the spindle against the right hand end so that the passage 35 is closed and the spindle is held against axial movement whether the vehicle is travelling forwards or backwards. The device therefore cannot operate below a predetermined vehicle speed and this is desirable in order to prevent possible judder.

As the speed increases, the shoes 38 are moved outwardly by centrifugal force into engagement with the flywheel and the springs 39 retract the sleeve 41 from the left hand end of the housing. The parts are then in the positions shown in FIGURE 3 and the spindle 25 is free to move axially to the left but does not not move so long as the vehicle is travelling normally and the wheel by which the spindle is driven is rotating normally. The forces acting on the spindle are balanced and this condition in which the passage 35 is closed and the left hand end of the sleeve 41 is clear of the left hand end of the housing continues during braking so long as there is no slipping of the wheel.

If the wheel is now rapidly decelerated, the speed of rotation of the worm 27 is reduced and the reaction between the worm and the worm wheel 28 tends to move the spindle to the left to uncover the passage 35 as shown in FIGURE 4. At the same time, if the adhesion between the vehicle wheels and the road surface is reasonably good, and the vehicle itself is being rapidly decelerated, the spindle 25 and the associated flywheel 36 will be subjected to inertia forces tending to move the spindle to the right, and if these forces are sufficiently high, the uncovering of the passage 35 will be prevented or delayed since the deceleration of the vehicle will be taking place at substantially the same rate as the deceleration of the wheel, and skidding is unlikely to occur.

When the wheel begins to accelerate again, the member 34 comes into operation. The purpose of this member is to reduce the air flow through the passage 35 as soon as possible after locking of the wheel has been controlled, and conditions are returning to normal. The orifice 33 in the member 34 is very small compared with the area of the passage 35, and when the spindle is being accelerated the member 34, which has been substantial inertia, unscrews itself from the spindle and engages the end of the passage 35 as shown in FIGURE 5, so that the rate of flow of air through the passage is reduced to a very low value before the spindle has had time to move to the right far enough to close the passage 35 completely. Thus conditions tend to return to normal as soon as acceleration starts, and not after equilibrium has again been reached. On continued acceleration the speed of rotation of the spindle is increased up to that of the flywheel and the spindle moves to the right to close the passage 33 in the member 34 and so cut off all air flow through the passage 35. As the spindle accelerates, the inertia of the member 34 returns it to its normal position on the spindle and all the parts of the mechanism are then in their normal running positions as shown in FIGURE 3.

The spindle may be positively locked against axial movement when it is being driven in reverse by providing on the sleeve 41 a flanged ring 43 which is connected to the sleeve by a screw-thread of such hand that, when the spindle is being driven in reverse, the ring partially unscrews itself and bears against the left hand end of the housing to urge the spindle in the other direction into the closed position. This lock is seen in operation in FIGURE 6.

The frictional grip between the clutch faces 36c, 37c varies with rate of deceleration of the vehicle. When the vehicle is being decelerated rapidly, inertia forces tend to move the flywheel to the right, which increases the frictional grip so that little or no slip occurs between the flywheel and the spindle. On the other hand, when the rate of deceleration is low, as for example when the vehicle is travelling on a road surface providing poor adhesion, and the angular deceleration of the wheel exceeds that of the vehicle, the clutch can slip. The one-way clutch allows the flywheel 36 to turn in this sense relative to the spindle. The slipping of the friction clutch is an important feature as it allows the flywheel to continue to rotate at a speed corresponding to the vehicle speed, and rapid application of the brakes does not automatically reduce the speed of rotation of the flywheel which will depend on the rate of deceleration of the vehicle.

The opening of a valve or the uncovering of a passage connected to an air supply by the devices described above may be arranged to reduce in any convenient way the braking effort applied to a wheel from which the devices are driven. Usually it will be desirable to employ a relay, and one convenient form of relay is shown in FIGURES 7 and 8. This relay comprises a fluid pressure cylinder 44 and a control valve. One end of the cylinder is connected by a pipe 45 to a source of vacuum and opposite ends of the cylinder are connected by pipes 46 and 47 to the valve housing 48. One end of the housing 48 is open to atmosphere through ports 49 and the other end has a passage 51 for the admission of air from the control device. A plate valve 52 urged by a spring 53 against an annular seating 54 in the housing normally closes communication between atmosphere and the pipe 46. A floating cup-shaped valve member 55 is supported within the housing 48 by spaced diaghragms 56 and 57. The pipe 47 is connected to the space between the diaphragms and an orifice 58 in the valve member connects that space with the space between the diaphragms 57 and the end wall of the housing in which the passage 51 is located. A spring 59 normally holds the valve member in the position shown in FIGURE 7 in which it is spaced from the plate valve 52 and the pipes 46 and 47 are in communication through ports 61 in the valve member so that both ends of the relay cylinder are under vacuum. When air is admitted to the housing through the passage 51, the valve member 55 moves to the left and first engages the plate valve 52 to cut off communication between the pipe 46 and vacuum, and then moves the plate valve away from its seating to connect the pipe 46 to atmosphere. Air at atmospheric pressure then enters the left hand end of the relay cylinder 44 and moves the piston 62 to the right.

When this relay is used in conjunction with a device as shown in FIGURES 4 to 6, the reduction in the air flow to the relay valve when the member 34 engages the end of the housing may be such that the plate valve 52 is allowed to return into engagement with its seating to cut off the power from the relay cylinder but the valve member 55 remains in engagement with the plate valve so that the piston 62 of the relay cylinder does not return until the flow of air to the relay valve is completely cut off.

The piston 62 may act directly on a brake pedal 63 to move it towards the off position, as shown in the drawings, or it may act on the piston of a master cylinder, or it may simply increase the volume of a portion of a hydraulic transmission line between a master cylinder and the wheel cylinders of a braked wheel.

In an alternative arrangement the relay valve may be connected to a vacuum booster or servo unit actuating an hydraulic master cylinder, the relay valve controlling the pressure differential in the booster.

I claim:

1. A device for preventing skidding of a vehicle comprising a spindle mounted for rotary and axial movement in a stationary housing adapted to be mounted in the vehicle with its axis parallel to the longitudinal axis of the vehicle, means for rotating the spindle at a speed directly proportional to the speed of rotation of a wheel of the vehicle, a flywheel mounted on said spindle and freely rotatable and axially movable relative to the spindle, said flywheel being coupled to the spindle by a slipping clutch arranged to limit the deceleration of said flywheel and loaded by inertia response of said flywheel, axially acting spring means normally holding the clutch in engagement, and means controlled by the axial position of the spindle dictated by said flywheel for varying the braking effort applied to the wheel from which the spindle is driven.

2. A device as in claim 1 wherein said means controlled by the axial position of the spindle comprises an opening in one end of the housing in alignment with the spindle and co-operating with the adjacent end of the spindle, the opening when uncovered allowing air to pass to means adapted to reduce the braking effort applied to the wheel by which the spindle is driven.

3. A device for preventing skidding of a vehicle comprising a spindle mounted for rotary and axial movement in a stationary housing adapted to be mounted in the vehicle with its axis parallel to the longitudinal axis of the vehicle, means for rotating the spindle at a speed directly proportional to the speed of rotation of a wheel of the vehicle including gearing which applies to the spindle an axial load varying with the speed and direction of the drive, a flywheel rotatable and axially movable on the spindle and coupled to the spindle by a slipping clutch, axially acting spring means normally holding the clutch in engagement, and means controlled by the axial position of the spindle for varying the braking effort applied to the wheel from which the spindle is driven.

4. A device for preventing skidding of a vehicle comprising a spindle mounted for rotary and axial movement in a stationary housing adapted to be mounted in the vehicle with its axis parallel to the longitudinal axis of the vehicle, means for rotating the spindle at a speed directly proportional to the speed of rotation of a wheel of the vehicle, a flywheel rotatable and axially movable on the spindle and coupled to the spindle by a slipping clutch, axially acting spring means normally holding the clutch in engagement, means controlled by the axial position of the spindle for varying the braking effort applied to the wheel from which the spindle is driven, a sleeve slidably mounted on the spindle and a spring located between said sleeve and the flywheel and operative to hold said slipping clutch normally in engagement and to urge said sleeve into engagement with one end of said housing, the other end of said housing having formed in it an opening normally closed by the adjacent end of the spindle.

5. A device as in claim 4 incorporating blade springs connecting the sleeve and flywheel and radially movable shoes mounted on said blade springs and adapted, when the spindle is rotating at a speed above a predetermined value, to move outwardly into engagement with an axially extending flange on the flywheel and to draw the sleeve away from the end of the housing.

6. A device as in claim 4 incorporating a flanged ring screwed onto said sleeve with a screw-thread of such hand that when the spindle is being driven in reverse the ring partially unscrews itself from the sleeve and bears against the adjacent end of the housing to move the spindle axially into engagement with the opening at the other end of the housing.

7. A device as in claim 4 wherein the end of the spindle adjacent to the opening in the end of the housing has mounted on it by means of a screw-thread a member having an orifice in its end of smaller area than the opening in the housing whereby when the spindle is being accelerated after locking of the vehicle wheel has been controlled the inertia force acting on the said member causes it to move axially on the spindle and engage the end of the housing to reduce rapidly to a low value the rate of flow of air through the opening.

8. A device for preventing skidding of a vehicle incorporating means for applying a braken ot at least one wheel of the vehicle, comprising a spindle driven from the wheel of the vehicle, a flywheel, means mounting said flywheel on said spindle for free rotational and axial movement relative to said spindle, said mounting means being so constructed and arranged that the flywheel is sensitive both to the angular deceleration of the wheel and to the deceleration of the vehicle itself, and means for controlling the effort applied to said wheel by said brake applying means in accordance with the behaviour of said flywheel including clutch means arranged to limit the deceleration of said flywheel and loaded by inertia response of said flywheel only.

9. A device as claimed in claim 8, wherein said clutch means is arranged to limit the deceleration of the flywheel in accordance with the linear deceleration of the vehicle.

10. A device for preventing skidding of a vehicle incorporating means for applying a brake on at least one wheel of the vehicle, comprising a flywheel, means driving said flywheel from the wheel of the vehicle, means mounting the flywheel so that it is sensitive both to the angular deceleration of the wheel and to the deceleration of the vehicle itself, means for controlling the effort applied to said wheel by said brake applying means in accordance with the behaviour of said flywheel including clutch means arranged to limit the deceleration of said flywheel, and means for preventing operation of said means for controlling the braking effort applied to the wheel when the vehicle is travelling below a predetermined speed and when the vehicle is travelling in reverse.

References Cited by the Examiner

UNITED STATES PATENTS

| | | | |
|---|---|---|---|
| 2,012,366 | 8/1935 | Wevers | 188—81 |
| 2,992,859 | 7/1961 | Sampietro | 303—24 |
| 3,011,833 | 12/1961 | Stelzer | 303—60 |
| 3,059,973 | 10/1962 | Parshall | 303—21 |
| 3,073,405 | 1/1963 | Hill et al. | |
| 3,223,459 | 12/1965 | Packer | 303—21 |

EUGENE G. BOTZ, *Primary Examiner.*